US012646336B2

(12) United States Patent
Jin et al.

(10) Patent No.: US 12,646,336 B2
(45) Date of Patent: *Jun. 2, 2026

(54) HETEROGENEOUS ON-VEHICLE CAMERA SYSTEM FOR OBJECT DETECTION

(71) Applicant: Rivian IP Holdings, LLC, Irvine, CA (US)

(72) Inventors: Elaine Wenying Jin, Newark, CA (US); Vidya Rajagopalan, Palo Alto, CA (US)

(73) Assignee: Rivian IP Holdings, LLC, Irvine, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 19/239,660

(22) Filed: Jun. 16, 2025

(65) Prior Publication Data

US 2025/0308262 A1 Oct. 2, 2025

Related U.S. Application Data

(63) Continuation of application No. 18/147,531, filed on Dec. 28, 2022, now Pat. No. 12,374,127.

(51) Int. Cl.
*G06V 10/60* (2022.01)
*G02B 5/30* (2006.01)
(Continued)

(52) U.S. Cl.
CPC ......... *G06V 20/588* (2022.01); *G02B 5/3025* (2013.01); *G06V 10/60* (2022.01);
(Continued)

(58) Field of Classification Search
CPC ...... H04N 23/74; H04N 23/76; H04N 13/337; G02F 1/00; G02F 1/335; G03B 35/26;
(Continued)

(56) References Cited

U.S. PATENT DOCUMENTS 8,831,286 B2 9/2014 Li et al.
9,489,728 B2 11/2016 Imagawa
(Continued)

OTHER PUBLICATIONS

Final Office Action on U.S. Appl. No. 18/147,531 dated Jul. 11, 2024.
(Continued)

*Primary Examiner* — Brian P Yenke
(74) *Attorney, Agent, or Firm* — Foley & Lardner LLP

(57) ABSTRACT

Systems and methods to enhance vehicle object detection capability are provided. The vehicle may include a first sensor coupled with a body of the vehicle, the first sensor having a first field of view and the first sensor comprising a polarizer. The vehicle may include a second sensor coupled with the body of the vehicle, the second sensor having a second field of view. The first field of view and the second field of view can at least partially overlap. The vehicle may include a processor coupled with memory. The processor can receive a first image captured by the first sensor and a second image captured by the second sensor. The processor can determine a luminance of light ratio associated with the first image and the second image, and can modify an image processing technique.

20 Claims, 7 Drawing Sheets

(51) Int. Cl.
  *G06V 10/74*          (2022.01)
  *G06V 20/56*          (2022.01)
  *H04N 23/76*          (2023.01)

(52) U.S. Cl.
  CPC ........... *G06V 10/761* (2022.01); *H04N 23/76*
    (2023.01); *G06V 2201/07* (2022.01)

(58) Field of Classification Search
  CPC ............... G02B 5/3025; G06V 20/588; G06V
    2201/07; G06V 10/761; G06V 10/60
  See application file for complete search history.

(56)                References Cited

U.S. PATENT DOCUMENTS

|  |  |  |  |  |
|---|---|---|---|---|
| 9,674,459 | B2 | 6/2017 | Kasahara et al. | |
| 10,084,959 | B1 | 9/2018 | Yu et al. | |
| 11,276,197 | B2 | 3/2022 | Ishida et al. | |
| 12,374,127 | B2 * | 7/2025 | Jin | G06V 20/588 |
| 2010/0045423 | A1 | 2/2010 | Glickman et al. | |
| 2010/0283885 | A1 | 11/2010 | Lin et al. | |
| 2012/0069181 | A1 | 3/2012 | Xue et al. | |
| 2012/0147187 | A1 | 6/2012 | Li et al. | |
| 2012/0268602 | A1 | 10/2012 | Hirai et al. | |
| 2018/0220110 | A1 | 8/2018 | Urbach et al. | |
| 2019/0208111 | A1 | 7/2019 | Wendel et al. | |
| 2019/0279013 | A1 * | 9/2019 | Miu | B60Q 1/085 |
| 2022/0368873 | A1 | 11/2022 | Nakamura | |
| 2023/0022108 | A1 | 1/2023 | Ghosh et al. | |
| 2023/0379445 | A1 | 11/2023 | Oka | |
| 2024/0175812 | A1 | 5/2024 | Andrews et al. | |
| 2024/0210722 | A1 | 6/2024 | Tashiro et al. | |
| 2024/0210778 | A1 | 6/2024 | Keicho et al. | |
| 2024/0221392 | A1 * | 7/2024 | Jin | G06V 10/60 |

OTHER PUBLICATIONS

Non-Final Office Action on U.S. Appl. No. 18/147,531 dated Jan. 29, 2025.
Non-Final Office Action on U.S. Appl. No. 18/147,531 dated Apr. 24, 2024.
Notice of Allowance on U.S. Appl. No. 18/147,531 dated May 16, 2025.

* cited by examiner

400

402 — Couple first sensor

404 — Couple second sensor

406 — Receive first image

408 — Receive second image

410 — Determine luminance of light ratio

412 — Modify an image processing operation

502

Provide vehicle

FIG. 5

HETEROGENEOUS ON-VEHICLE CAMERA SYSTEM FOR OBJECT DETECTION

CROSS-REFERENCE TO RELATED APPLICATIONS

This application is a continuation of U.S. patent application Ser. No. 18/147,531 (which has issued as U.S. Pat. No. 12,374,127), filed Dec. 28, 2022, which is hereby incorporated by reference herein in its entirety.

INTRODUCTION

A vehicle, such as an electric vehicle, can include sensors that generate images of the surrounding environment. The images can be used for object detection.

SUMMARY

This disclosure is generally directed to a solution for mitigating the effects of saturated images captured by vehicle cameras. Vehicles today often use cameras for self-driving or for generating alerts of upcoming obstacles. For example, a vehicle can include cameras that capture images of the surrounding environment and a processor that can use object detection techniques on the images to detect objects around the vehicle. The processor can use the detected objects to generate alerts or to drive the vehicle. However, the processor may not be able to accurately detect objects in images in certain circumstances (e.g., at certain times during the day when there is a high level of light reflection or when the images contain certain objects that may not be accurately detected, such as a bright traffic light that saturates the cameras). To overcome these and other technical deficiencies, a vehicle as described herein can include two cameras with overlapping fields of view: a first camera with a polarizer that lowers the luminance of the light the camera captures, and a second camera without such a polarizer. The polarizer can cause the first camera with the polarizer to capture unsaturated images of scenes with a high level of reflection that the processor can use to detect objects in such images. The second camera with the partially overlapping field of view with the first camera with the polarizer may not include a polarizer and therefore can capture images of scenes in which brightness is low. Thus, the cameras can operate together to capture images in different scenarios for on-vehicle object detection.

At least one aspect is directed to a vehicle. The vehicle can include a first sensor coupled with a body of the vehicle, the first sensor having a first field of view and the first sensor comprising a polarizer. The vehicle can include a second sensor coupled with the body of the vehicle, the second sensor having a second field of view. The first field of view and the second field of view can have an at least partially overlapping field of view. The vehicle can include a processor coupled with memory. The processor can receive a first image captured by the first sensor and a second image captured by the second sensor. The processor can determine a luminance of light ratio associated with the first image and the second image. The processor can, responsive to determining the luminance of light ratio exceeds a threshold value, cause a luminance of light of the first image to substantially match a luminance of light of the second image.

At least one aspect is directed to a method. The method can include coupling a first sensor with a body of a vehicle, the first sensor having a first field of view and the first sensor comprising a polarizer. The method can include coupling a second sensor with the body of the vehicle, the second sensor having a second field of view, the first field of view and the second field of view having an at least partially overlapping field of view. The method can include receiving, by one or more processors, a first image captured by the first sensor and a second image captured by the second sensor. The method can include determining, by the one or more processors, a luminance of light ratio associated with the first image and the second image. The method can include, responsive to determining the luminance of light ratio exceeds a threshold value, causing, by the one or more processors, a luminance of light of the first image to substantially match a luminance of light of the second image.

At least one aspect is directed to a system. The system can include a vehicle. The vehicle can include a first sensor coupled with a body of the vehicle, the first sensor having a first field of view and the first sensor comprising a polarizer. The vehicle can include a second sensor coupled with the body of the vehicle, the second sensor having a second field of view. The first field of view and the second field of view can have an at least partially overlapping field of view. The first sensor can be configured to detect light from the first field of view and the second sensor configured to detect light from the second field of view. The system can include a processor coupled to memory. The processor can receive a first image generated from the light detected by the first sensor and a second image generated from the light detected by the second sensor. The processor can detect an object from the first image or the second image. The processor can generate instructions based on the detected object.

At least one aspect is directed to a vehicle. The vehicle can include a first sensor coupled with a body of the vehicle, the first sensor having a first field of view and the first sensor comprising a polarizer. The vehicle can include a second sensor coupled with the body of the vehicle, the second sensor having a second field of view. The first sensor can be configured to detect light from the first field of view and the second sensor can be configured to detect light from the second field of view. The vehicle can include a processor coupled with memory. The processor can be configured to increase an analogue or digital gain of the light detected by the first sensor, the increase causing the luminance of the light detected by the first sensor to substantially match the luminance of the light detected by the second sensor.

At least one aspect is directed to a system. The system can include one or more processors. The one or more processors can be coupled with memory to determine, responsive to an arrival of an electric vehicle at a dispenser of a plurality of dispensers coupled with a power module of a power cabinet, a status of each of the plurality of dispensers. The one or more processors can be coupled with memory to generate a schedule to control the plurality of dispensers based at least in part on the status of each of the plurality of dispensers. The one or more processors can be coupled with memory to provide the schedule to the power cabinet to cause the power cabinet to control the power module to deliver power to one of the plurality of dispensers in accordance with the schedule.

At least one aspect is directed to a vehicle. The vehicle can include a first sensor coupled with a body of the vehicle, the first sensor having a first field of view and the first sensor comprising a polarizer. The vehicle can include a second sensor coupled with the body of the vehicle, the second sensor having a second field of view. The first field of view and the second field of view can have an at least partially overlapping field of view. The first sensor can be configured to detect light from the first field of view, and the second sensor can be configured to detect light from the second field of view.

At least one aspect is directed to a vehicle. The vehicle can include a first sensor coupled with a body of the vehicle, the first sensor having a first field of view and the first sensor comprising a polarizer. The vehicle can include a second sensor coupled with the body of the vehicle, the second sensor having a second field of view. The first field of view and the second field of view can have an at least partially overlapping field of view. The vehicle can include a processor coupled with memory. The processor can receive a first image captured by the first sensor and a second image captured by the second sensor. The processor can determine a luminance of light ratio associated with the first image and the second image. The processor can, responsive to determining the luminance of light ratio exceeds a threshold value, modify an image processing operation associated with the first image or the second image.

At least one aspect is directed to a method. The method can include coupling a first sensor with a body of a vehicle, the first sensor having a first field of view and the first sensor comprising a polarizer. The method can include coupling a second sensor with the body of the vehicle, the second sensor having a second field of view, the first field of view and the second field of view having an at least partially overlapping field of view. The method can include receiving, by one or more processors, a first image captured by the first sensor and a second image captured by the second sensor. The method can include determining, by the one or more processors, a luminance of light ratio associated with the first image and the second image. The method can include, responsive to determining the luminance of light ratio exceeds a threshold value, modifying, by the one or more processors, an image processing operation associated with the first image or the second image.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 depicts a method of providing a vehicle with enhanced object detection capability, in accordance with present implementations.

DETAILED DESCRIPTION

Figure 1:
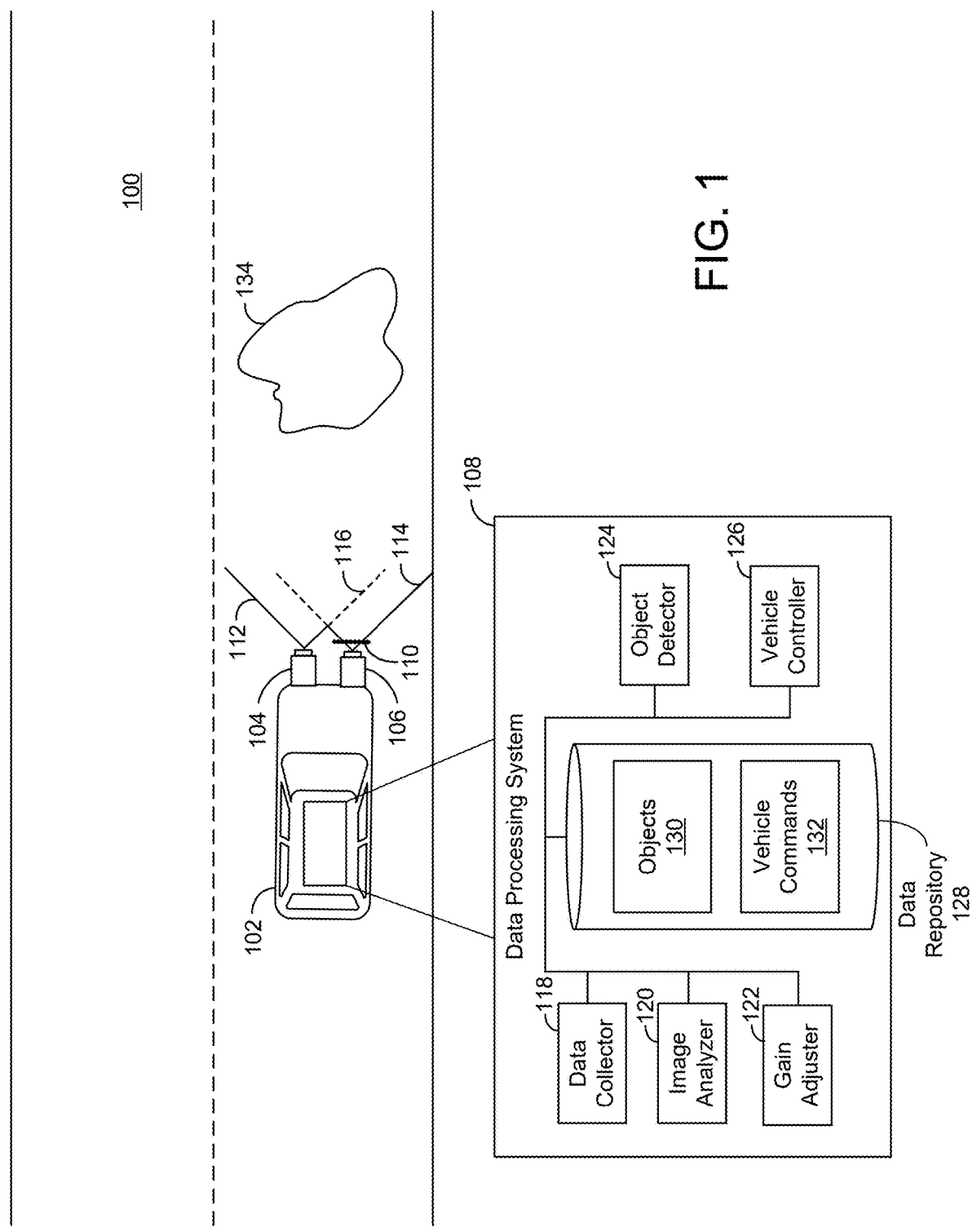
FIG. 1 depicts a system to enhance object detection capability, in accordance with present implementations.

Following below are more detailed descriptions of various concepts related to, and implementations of, methods, apparatuses, and systems of enhancing object detection capability. The various concepts introduced above and discussed in greater detail below may be implemented in any of numerous ways.

This disclosure is generally directed to a solution for mitigating the effects of saturated images captured by vehicle cameras. Vehicles today often use cameras for self-driving or for generating alerts of upcoming obstacles. A few examples include capturing images of lane markers in the road to control a vehicle to stay within the lane markers while driving and capturing images of a red light at a traffic light to control a vehicle to a stop. For a processor to accurately detect the lane markers and the red light at the traffic light from the captured images, the images may have to have certain characteristics, such as certain levels of contrast or saturation. If the processor receives an overly saturated or contrasted image, the processor may improperly detect objects within the image or fail to detect objects within the image. The processor may not detect lane markers or red lights as a result of the processor improperly or failing to detect objects within images of the lane markers or red lights.

Cameras of vehicles can be particularly affected by image saturation during certain times of the day, such as during sunrise and sunset. During these times, the sun can be low over the horizon and thus cause light generated by the sun to have a low trajectory and reflection angle off of the road or other horizontal surfaces. The low reflection angle of the light can cause cameras of vehicles to capture saturated images of the surrounding environment. The saturation can cause a processor processing the saturated to improperly or fail to detect objects within the saturated images.

Cameras can also be affected by artificial bright lights on the road. For example, traffic lights are often configured to be the brightest lights on the road. However, because traffic lights are configured to be bright, the brightness of the traffic lights can cause images of the traffic lights to be saturated. Accordingly, a processor processing the saturated images of the traffic lights may not accurately detect the light of the traffic lights. One solution to addressing the problem of saturation caused by traffic lights is reducing the exposure time of the cameras capturing the images of the traffic lights. Reducing the exposure time can reduce the saturation of the images because doing so can reduce the amount of light that is captured when capturing the images. However, reducing the exposure time can cause the images captured by the cameras to not include the lights (e.g., the red lights, yellow lights, or green lights) of the traffic lights given the modulation of the light from a typical traffic light.

To solve these and other technical challenges, a polarizer can be coupled with a lens of a camera of a vehicle. The polarizer can be a linear vertical polarizer that blocks horizontally oriented light waves from reaching a lens of the camera. Coupling the polarizer with the lens of the camera can reduce the brightness of images the camera captures, particularly by filtering out the horizontal light waves the camera captures. Such filtering can be useful for object detection in vehicles, for example, in instances such as when processing images of traffic lights (which can illustrate red lights as yellow lights when saturated) and when processing images captured during sunrise or sunset when sunlight reflects off of the ground at a higher rate (which can cause images to have a brightness that is too high for accurate object detection). Reducing the brightness of the images can reduce the chances that the images are saturated. Accordingly, a processor can process images the polarized camera generates of objects or environments that would otherwise be saturated if they were to be generated from a non-polarized camera.

The vehicle can include a camera with a polarizer and a camera without a polarizer. Doing so can increase the dynamic range (e.g., the range of brightness of images for which a processor of the vehicle can accurately detect objects) of the vehicle. For example, the camera that includes a polarizer and the camera without a polarizer can have separate fields-of-view. The cameras can point in the same direction such that there is a partially overlapping field of view between the two cameras. The camera with the polarizer can capture unsaturated images in situations in which the camera without the polarizer captures saturated images. The camera without the polarizer can capture images in which the processor can detect objects in low light scenes when the camera with the polarizer may not detect enough light to capture such images. Accordingly, the two cameras on the vehicle can operate together to increase the dynamic range of the cameras on the vehicle.

The polarizer can cause the camera with the polarizer to generate or capture images with a lower luminance than if the camera did not have a polarizer. Accordingly, images captured by the camera may need to be adjusted to enable the processor to detect objects from such images. For example, the camera can capture an image of a stop sign in the middle of the day. Because the polarizer on the camera can dim the light captured by the camera even in cases in which the camera would not be saturated, the image can have low luminance, particularly compared to images captured by other cameras on the vehicle at substantially the same time. The dimness of the image can cause the processor of the vehicle to improperly or fail to detect the stop sign from the image. To account for the dim image, the processor can increase the luminance of the light of the image from the polarized camera such that the processor can more accurately detect objects from the image.

The processor can implement one or more rules to determine instances in which to adjust the luminance of images captured by the polarized camera (e.g., the camera that has the polarizer). For example, the processor can detect the luminance of light of an image captured by the polarized camera or luminance of light of a concurrently captured image by the unpolarized camera (e.g., the camera that does not have a polarizer). The processor can determine a ratio of the two luminance and compare the ratio to a threshold. Responsive to determining the ratio exceeds the threshold, the processor can increase the luminance of the image captured by the polarized camera (e.g., increase the luminance of the image to substantially match the image captured by the unpolarized camera). In another example, the processor can compare the luminance of the light to an image captured by the polarized camera to a threshold. Responsive to determining the luminance is less than the threshold, the processor can increase the luminance of the light of the image (e.g., increase the luminance of the light of the image to reach or exceed the threshold). Accordingly, the image captured by the polarized camera can have a luminance value that may not hamper the processor's capability to detect objects from the image.

Adding a polarizer to an on-vehicle camera can mitigate sunlight-related flare, enhance camera dynamic range, and extract depth from objects captured by on-vehicle cameras. For example, when the sun is low in the sky, reflected sunlight from the ground can be strong, making it difficult for on-vehicle processors to detect lane markers from images of the lane markers. Because the light incident angle can be close to Brewster's angle, the reflected sunlight can become largely polarized. Adding a linear polarizer in front of one of the on-vehicle cameras can help screen out the reflected sunlight, causing road features to become more visible in images captured by the polarized camera. In another example, in automotive applications, on-vehicle cameras commonly see high dynamic range scenes. Adding a linear polarizer (e.g., a vertical linear polarizer) to one of the on-vehicle cameras can cause the light intensity of light detected by the camera to be reduced. Accordingly, adding the linear polarizer can reduce signal saturation and can enable the image capture of high light intensity objects such as traffic lights with minimal, if any, saturation. In another example, the camera with the polarizer can be a stereo camera that is separated by a baseline or defined distance from another stereo camera with a polarizer. The separation can enable a processor to extract depth information from images captured by the two cameras using matching algorithms (e.g., stereo matching algorithms). To improve the depth extraction process, the processor can increase the luminescence of light of images captured by the camera with the polarizer with higher digital or analogue gains to match or substantially match the image luminance of the image captured by the camera without a polarizer.

FIG. 1 depicts an example system 100 for enhanced object detection (e.g., on-vehicle object detection capability), in accordance with present implementations. The system 100 can include at least one vehicle 102. The vehicle 102 can include an electric vehicle, hybrid vehicle, or internal combustion engine vehicle. A vehicle (e.g., a vehicle including a vehicle body) 102 can include two sensors 104 and 106 and a data processing system 108. The data processing system 108 can be the same as or similar to the data processing system 108 shown and described with reference to FIG. 7. The vehicle 102 can be a vehicle similar to or the same as the vehicle 102 shown and described with reference to FIG. 6. The sensor 106 can include a polarizer 110. The sensor 104 can have a field of view 112 and the sensor 106 can have a field of view 114. The field of view 112 and the field of view 114 can have a partially overlapping field of view 116. Light detected by the sensor 106 from the field of view 114 can have a lower luminance than light detected by the sensor 104 from the field of view 112, which can be a result of the polarizer 110 of the sensor 106.

The sensors 104 and 106 can generate images from light detected from the fields of view 112 and 114, respectively. The sensors 104 and 106 can transmit the images to the data processing system 108. For instance, the sensors 104 and 106 can concurrently capture images of an object 134 in the middle of the road and transmit the images to the data processing system 108. The data processing system 108 can receive and analyze the images to determine whether to generate any alerts or vehicle commands or instructions to use to control the vehicle 102.

The sensors 104 and 106 can be or include stereo cameras. The sensors 104 and 106 can be or include two or more cameras coupled to the vehicle 102. The sensors 104 and 106 can each include one or more lenses and an image sensor for each lens. The sensors 104 and 106 can be coupled with the body of the vehicle 102. For example, the sensors 104 and 106 can be disposed on at least one of a bumper of the vehicle 102, an inside of a windshield of the vehicle 102, a hood of the vehicle 102, a window of the vehicle 102, a side panel of the vehicle 102, or a trunk of the vehicle 102. The sensors 104 and 106 can be disposed on the body of the vehicle 102 such that the lenses of the sensors 104 and 106 face in the same direction or otherwise have the partially overlapping field of view 116. In one example, the sensors 104 and 106 can be separated by a baseline distance that enables the data processing system 108 to detect or generate depth information from images captured by the sensors 104 and 106 within the partially overlapping field of view 116. The sensors 104 and 106 can communicate with the data processing system 108 over a communication link (e.g., a wired or wireless interface) to transmit images to the data processing system 108 or to receive rotation commands from the data processing system 108.

The sensor 106 can include or have a polarizer 110. The polarizer 110 can be or include a vertical linear polarizer that filters out horizontal light waves or a horizontal linear polarizer that filters out vertical light waves. The polarizer 110 can be coupled to a lens of the sensor 106. The polarizer 110 can be coupled in front of the lens of the sensor 106 (e.g., the polarizer 110 can be snapped in front of or onto the lens). Accordingly, the polarizer 110 can reduce the amount of light the sensor 106 receives when capturing images from the field of view 114, which can be beneficial in instances in which the field of view 114 captures reflected light or otherwise bright light (e.g., light from a traffic light) that would cause images the sensor 106 captures to be saturated with the polarizer 110.

The sensor 104 may not include a polarizer. The sensor 104 may not include a polarizer to enable the sensor 104 to capture images that have enough luminance for objects to be detected (e.g., accurately detected) in cases in which the polarizer 110 of the sensor 106 causes the sensor 106 to capture images with a low luminance such that objects may not be accurately detected. Accordingly, the configurations of the sensor 104 without a polarizer and the sensor 106 with the polarizer 110 can increase the dynamic range (e.g., the ratio between the maximum and minimum measurable light intensities without becoming saturated) of the images the sensors 104 and 106 can capture.

The data processing system 108 can include or execute on one or more processors or computing devices. The data processing system 108 can be located on the vehicle 102 (e.g., be electrically connected to the circuitry of the vehicle 102) or can be remote from the vehicle 102 can communicate with components of the vehicle 102 over a network (e.g., a wireless network). The data processing system 108 can include at least one data collector 118. The data processing system 108 can include at least one image analyzer 120. The data processing system 108 can include at least one gain adjuster 122. The data processing system 108 can include at least one object detector 124. The data processing system 108 can include at least one vehicle controller 126. The data processing system 108 can include at least one data repository 128. The data collector 118, image analyzer 120, gain adjuster 122, object detector 124, and vehicle controller 126 can each include at least one processing unit or other logic device such as a programmable logic array engine, or module configured to communicate with the data repository 128 or database. The data collector 118, image analyzer 120, gain adjuster 122, object detector 124, and vehicle controller 126 can be separate components, a single component, or part of the data processing system 108. The data processing system 108 can include hardware elements, such as one or more processors, logic devices, circuits, or memory.

The data repository 128 can include one or more local or distributed databases, and can include a database management system. The data repository 128 can include computer data storage or memory and can store objects 130. The objects 130 can be or include identifications of real-world objects. For example, the objects 130 can be identifications of objects that can commonly be in the surrounding environment of vehicles. Examples of such objects can include rocks, overturned vehicles, traffic lights, street signs, yield signs, road markings, people, and animals. The objects 130 can also include outlines or contours outlining the respective objects 130. The data processing system 108 can compare subsections or areas of images to the object contours of the objects 130. The data processing system 108 can detect objects from the images by identifying objects in the data repository 128 that have outlines that match (e.g., match above a threshold) outlines of objects in the subsections or areas of the images. The data processing system 108 can determine which objects are in the image by identifying the object identifications of any objects the data processing system 108 detects based on the comparison with the object outlines.

The data repository 128 can include vehicle commands 132. The vehicle commands 132 can be or include instructions that change the operation or state of the vehicle 102. The vehicle commands 132 can include vehicle commands or instructions such as, for example, turn left, turn right, slow down, speed up, and stop. The vehicle commands 132 can have stored associations with identifications of the objects or other criteria. For example, the vehicle commands 132 can include criteria indicating when to execute the vehicle command 132. For instance, a vehicle command 132 can be triggered when the data processing system 108 detects a rock 30 yards in front of the vehicle 102. The vehicle command 132 can be triggered in this instance because of conditions stored in a data structure (e.g., a relational table) for the vehicle command 132 that include an identification of a rock object (or any object). One example of a condition is a combination of a minimum or speed of the vehicle 102 and a location or distance of the object relative to the vehicle 102 when the data processing system 108 determines whether the condition is satisfied or when the data processing system 108 received the image from which the data processing system detected the rock. Upon determining a condition for a vehicle command 132 is satisfied and identifying the corresponding vehicle command 132, the data processing system 108 can execute the identified vehicle command 132 and adjust the configuration or state of the vehicle 102 according to the vehicle command 132.

In operation, the data collector 118 of the data processing system 108 can receive images that are generated by the sensors 104 and 106. To do so, the data collector 118 can communicate with the sensors 104 and 106 over a communications interface to receive images the sensors 104 and 106 generate or capture. For example, the sensors 104 and 106 can be configured to capture images at set time intervals (e.g., every millisecond, every second, or any other time interval). At each time interval, the sensors 104 and 106 can each capture an image from the fields of view 112 and 114, respectively, and transmit the images to the data collector 118. The sensors 104 and 106 can be configured to capture images continuously or capture videos and transmit the continuously captured images or videos to the data collector 118.

The image analyzer 120 can analyze images the data collector 118 collects to determine whether to adjust the images. For example, the image analyzer 120 can determine the luminance of light of images the sensors 104 and 106 capture. The image analyzer 120 can do so, for example, by extracting values for the red, green, and blue from the images. The image analyzer 120 can execute a relative luminance function using extracted values for the reds, greens, and blues (e.g., luminance=$0.2126*R_{lin}$+$0.7152*G_{lin}$+$0.0722*B_{lin}$). The image analyzer 120 can determine the luminance for each image the sensors 104 and 106 capture using any function.

The image analyzer 120 can identify matching images captured by the sensors 104 and 106 capture (e.g., concurrently capture). For example, the image analyzer 120 can identify an image the data processing system 108 receives from the sensor 104 within a defined time frame or time threshold of an image the data processing system 108 receives from the sensor 106. For instance, upon receiving the images from the sensors 104 and 106, the data collector 118 can label the images with timestamps indicating the times in which the data collector 118 received the images and which of the sensors 104 and 106 transmitted the images. The sensors 104 and 106 can also or instead label the images the sensors 104 and 106 generate with timestamps indicating when the sensors 104 and 106 generated the images. The image analyzer 120 can compare the timestamps of images from the sensor 104 with timestamps of images from the sensor 106. The image analyzer 120 can identify timestamps that are within a threshold or range (e.g., a defined threshold or range) of each other based on the comparison. The image analyzer 120 can identify images of the identified timestamps as matching images.

The image analyzer 120 can compare the luminance of the matching images. The image analyzer 120 can compare the luminance by determining a ratio of the luminance of the image from the sensor 104 to the luminance of the image captured by the sensor 106. Because the sensor 104 may not include a polarizer and the sensor 106 can include a polarizer, the image captured by the sensor 106 will likely have a higher luminance than the image captured by the sensor 104.

The image analyzer 120 can compare the ratio to a threshold (e.g., a ratio threshold). The threshold can be a defined value input by an administrator. The image analyzer 120 can compare the ratio to the threshold by comparing the value of the ratio to the value of the threshold.

Responsive to the image analyzer 120 determining the ratio exceeds the threshold, the gain adjuster 122 can determine a gain to change the luminance of one of the matching images. The gain adjuster 122 can determine the gain that causes the luminance of the matching images to match or substantially match. For example, the gain adjuster 122 can identify the matching image for which to adjust a gain. The gain adjuster 122 can do so based on the comparison of the luminance (e.g., identify the image captured by the sensor 106) based on the image having a lower than the other image captured by the sensor 104) or by identifying the image captured by the sensor 106 based on the sensor 106 having the polarizer 110. The image analyzer 120 can determine a gain that will increase the luminance of the lower luminance image to cause the luminance of the images to match or substantially match. The image analyzer 120 can determine the gain to be equal or substantially equal to the ratio of the luminance of the images.

The gain adjuster 122 can adjust or set the gain of the image captured by the sensor 106. The gain adjuster 122 can do so by increasing an analogue or digital gain to the gain the gain adjuster 122 determined will cause the luminance of the images to match or substantially match. The gain adjuster 122 can use the increased gain on the signal of the image with the lower luminance to cause the luminance of the signal to match or substantially match the luminance of the corresponding matching image. Accordingly, the gain adjuster 122 can adjust the luminance of an image of a pair of matching images such that the matching images can be analyzed for depth information of common objects between the two images. The gain adjuster 122 can do so in situations in which the polarizer 110 of the sensor 106 can cause the image captured by the sensor 106 to have a luminance that would be too low to be analyzed for object detection or could cause the depth measurements performed on the pair of images to be inaccurate.

The image analyzer 120 can compare the luminance of the image from the sensor 106 to a threshold (e.g., a luminance threshold). The image analyzer 120 can do so to determine whether to adjust the gain of the image. The image analyzer 120 can compare the luminance of the image to the threshold instead of or in addition to comparing a ratio of matching images to a threshold. Responsive to determining the luminance of the image is less than the threshold, the gain adjuster 122 can determine to increase the gain of the image.

The gain adjuster 122 can determine a gain for the image by determining a gain that will cause the luminance of the image to reach or exceed the threshold. For example, the gain adjuster 122 can divide a value of the threshold by the luminance of the image to determine the gain. The gain adjuster 122 can determine the gain and apply the gain by increasing the analogue or digital gain of the image to the determined gain. Accordingly, the image analyzer 120 and gain adjuster 122 can account for the lower luminance of images captured by the sensor 106 automatically to enable object recognition techniques to be used on such images.

The gain adjuster 122 can adjust the analogue or digital gain of light detected by the sensor 106 by a defined value. For instance, the amount in which the polarizer 110 causes the luminance of light detected by the sensor 106 to lower can be a previously stored value (e.g., a user input value) or determined based on previous gains the gain adjuster 122 has determined. For example, the gain adjuster 122 can generate a record (e.g., a file, document, or table in memory) that includes the gains the gain adjuster 122 determines for images captured by the sensor 106 over time. Responsive to identifying gains that are within a range (e.g., a defined range) for a number (e.g., a defined number) of images in a row or for a percentage (e.g., a defined percentage) of the images, the gain adjuster 122 can determine the gain to be a value within the range, such as an average of the range or one of the gains that were within the range. The gain adjuster 122 can store the determined gains in memory. The gain adjuster 122 can increase the analogue or digital gain of images from the sensor 106 to such a stored gain. Accordingly, the gain adjuster 122 can adjust the gains for images without pre-processing every image to determine the gains for each image. In this way, the gain adjuster 122 can substantially reduce processing power when the sensors 104 and 106 capture and transmit images or video to the data processing system 108 at a high rate.

The object detector 124 can use object recognition techniques on the images captured by the sensors 104 and 106 (e.g., the images after the gain adjuster 122 adjusted the gains of the images). The object detector 124 can use object recognition techniques, for example, by executing a machine learning model (e.g., a neural network) to detect objects in the images or by comparing outlines in the images to the outlines of the objects 130 in the data repository 128 and identify outlines that match above a threshold. The object detector 124 can analyze each image the sensors 104 and 106 capture to detect objects in the images.

The object detector 124 can determine depth and distance information from the matching images. The object detector 124 can do so to detect the distances of different objects from the vehicle 102. The object detector 124 can determine the depth and distance information using stereo camera depth processing techniques based on a baseline distance between the sensors 104 and 106. Because the gain adjuster 122 can adjust the gain of the images captured by the sensor 106 to match or substantially match the luminance of the images captured by the sensor 104, the object detector 124 may be able to more accurately determine depth and distance information of objects detected in matching images from the sensors 104 and 106.

In one example, the object detector 124 can detect a fallen tree in the middle of the road from two images the sensors 104 and 106 capture. The vehicle 102 can be driving towards the fallen tree. The object detector 124 can use stereo camera depth processing techniques to determine a distance between the vehicle and the fallen tree from the two images based on the baseline between the two sensors 104 and 106. As the vehicle 102 drives towards the tree, the sensors 104 and 106 can continuously capture images of the tree. The object detector 124 can identify the tree and the distance between the vehicle 102 and the tree from each of images.

The vehicle controller 126 can use objects and distance information generated by the object detector 124 to determine a vehicle command from the data processing system 108. For example, the vehicle controller 126 can use detected objects (e.g., object identifications) and distances from a pair of matching images as an index to query the vehicle commands 132 in the data repository 128. The vehicle controller 126 can identify a matching vehicle command 132 based on the query. The vehicle controller 126 can adjust the state or operation of the vehicle 102 based on the identified vehicle command 132.

In one example, the vehicle controller 126 can cause the vehicle 102 to stop in the road according to a vehicle command 132 in response to the sensors 104 and 106 capturing images of a stop sign. For instance, the object detector 124 can extract a stop sign object from images of the stop sign and a distance between the vehicle 102 and the stop sign from the images. The vehicle controller 126 can compare an identification of a stop sign object and the determined distance to the vehicle commands 132 to identify a vehicle command 132 that causes the vehicle 102 to slow down or stop at the stop sign. The vehicle controller 126 can similarly detect a red light and control the vehicle 102 to stop at the detected red light or a lane marker and control the vehicle 102 to avoid crossing the lane marker. Accordingly, the vehicle controller 126 can control the vehicle using instructions the vehicle controller 126 retrieves from the data repository based on object and distance data the object detector 124 generates.

In another example, the vehicle controller 126 can generate alerts instead of instructions to change the state or operation of the vehicle 102. For instance, the object detector 124 can extract a stop sign object from images of a stop sign and a distance between the vehicle 102 and the stop sign from the images. The vehicle controller 126 can compare an identification of a stop sign object and the determined distance to the vehicle commands 132 to identify a vehicle command 132 that includes haptic, visual, or auditory feedback for a driver of the vehicle 102 to stop at the stop sign. Accordingly, the vehicle controller 126 can notify a driver of an upcoming obstacle or a reason to stop based on objects on the roadway.

The object detector 124 can only detect objects from one image between matching images from the sensors 104 and 106. For example, responsive to identifying matching images captured by the sensors 104 and 106, the object detector 124 can identify the timestamps of the matching images. The object detector 124 can compare one or both of the timestamps to a time frame to determine if one or both of the timestamps are within the time frame (e.g., a time frame that corresponds to a time window of a sunrise or a sunset). Responsive to determining one or both of the timestamps are within the time frame, the object detector 124 can only analyze only the image captured by the sensor 106. In this way, the object detector 124 can avoid using processing resources to detect objects from the sensor 104 during time periods in which the sensor 104 is likely to be saturated from reflected light. Because the sensor 106 includes the polarizer 110, the object detector 124 may be able to accurately detect objects from the images captured by the sensor 106 during such time periods, thus taking advantage of the enhanced dynamic range adding a polarizer to the sensor 106 provides.

In another example, the object detector 124 can only detect objects from one image between matching images from the sensors 104 and 106 responsive to the images having a difference in luminance values that exceeds a threshold (e.g., a difference threshold). For example, the image analyzer 120 can compare the luminance values of two matching images with each other to determine a difference between the two luminance values. The image analyzer 120 can compare the difference to a threshold. Responsive to determining the difference exceeds the threshold, the object detector 124 can use object recognition techniques on the image from the sensor 106 without the gain adjuster 122 adjusting the gain on the image. The object detector 124 can do so because if the difference in luminance between two images is too large, increasing the gain so the luminance match can cause the image from the sensor 106 to have too much noise or to lose too much semantic information for accurate object detection. By maintaining the luminance value in the image and only evaluating the image, the object detector 124 can more accurately detect objects within the image.

Figure 2:
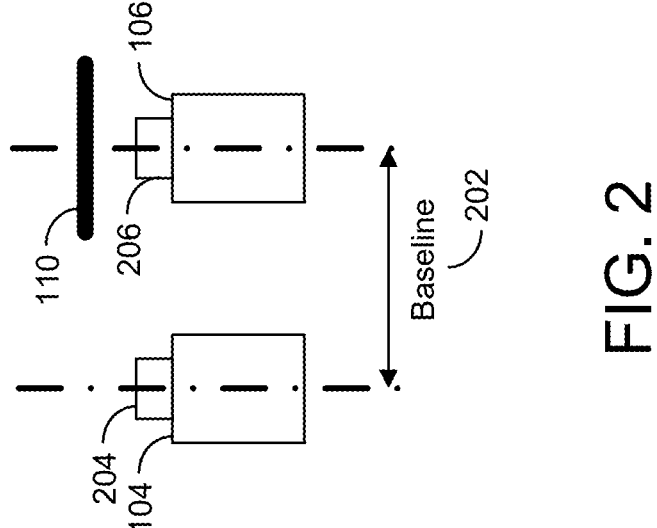
FIG. 2 depicts cameras configured to enhance object detection capability, in accordance with present implementations.

FIG. 2 depicts the sensors 104 and 106 configured to enhance object detection capability, in accordance with present implementations. The sensors 104 and 106 can be coupled to a vehicle (e.g., the vehicle 102) and be separated by a baseline 202. The sensors 104 and 106 can include lenses 204 and 206, respectively. The polarizer 110 can be coupled to the lens 206. The baseline 202 can be a distance (e.g., a value indicating a distance) between the sensors 104 and 106. The baseline 202 can be used to determine a depth or distance of an object from the vehicle. For example, the data processing system 108 can determine a distance of an object in images captured by the sensors 104 and 106 according to the following equation:

$$Depth=(focallength*baseline)/disparity.$$

The data processing system 108 can store the baseline 202 in memory. The data processing system 108 can retrieve the baseline 202 to determine depth information of objects that are depicted in both of the matching images (e.g., determine the depth information according to a stereo camera depth processing technique).

Figure 3:
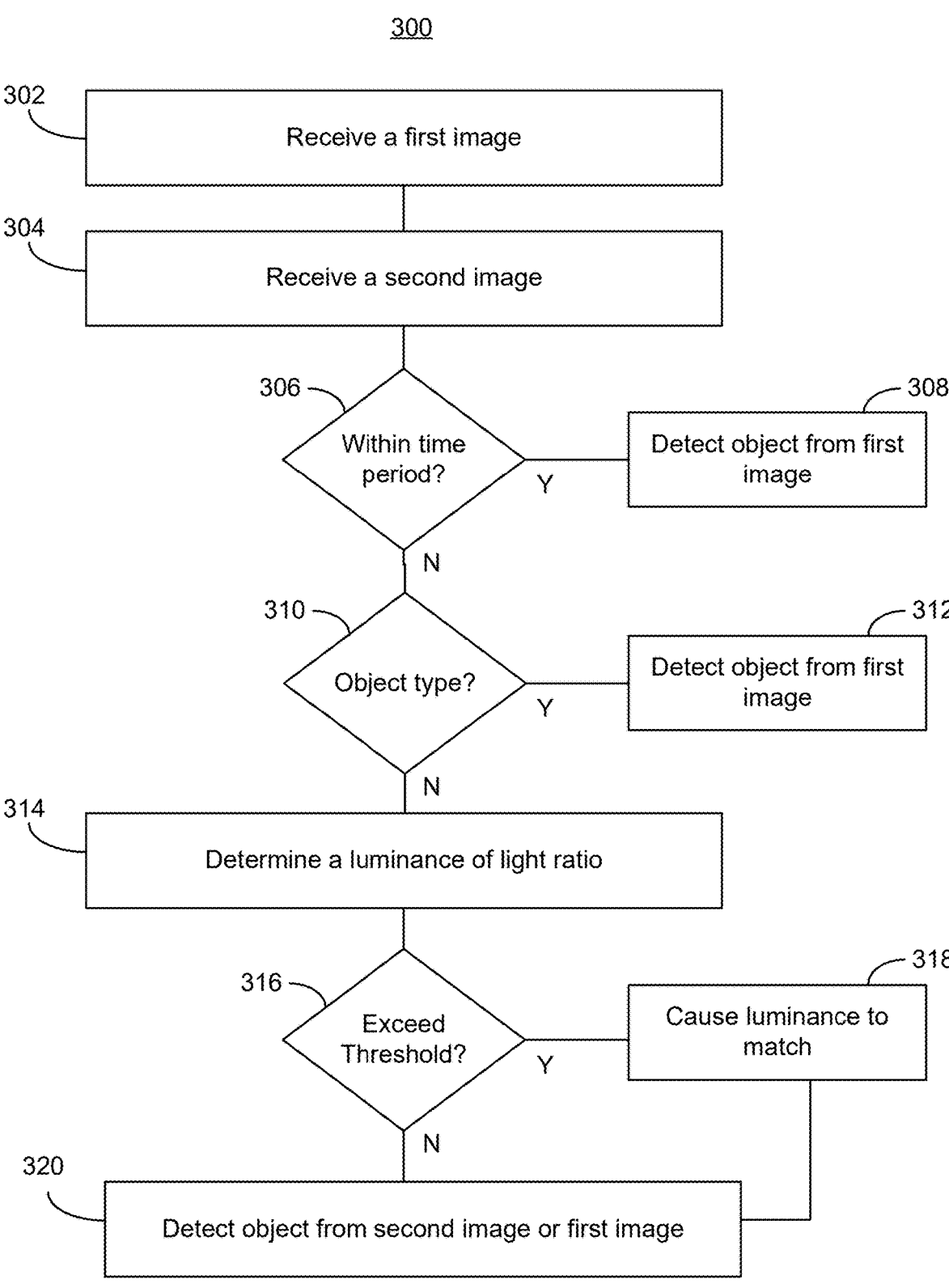
FIG. 3 depicts a method of enhancing object detection capability, in accordance with present implementations.

FIG. 3 depicts a method 300 of enhancing object detection capability (e.g., on-vehicle object detection capability), in accordance with present implementations. The method 300 can be performed by one or more components depicted in the system 100 of FIG. 1 or data processing system 108 of FIG. 7. For example, the method 300 can be performed by a data processing system (e.g., data processing system 108, shown and described with reference to FIG. 1). The method 300 can include receiving a first image (ACT 302). The method 300 can include receiving a second image (ACT 304). The method 300 can include determining whether the first image or the second image is associated with a time period (ACT 306). The method 300 can include detecting an object from the first image (ACT 308). The method 300 can include determining an object type (ACT 310). The method 300 can include detecting an object from the first image (ACT 312). The method 300 can include determining a luminance of light ratio (ACT 314). The method 300 can include determining whether the luminance of light ratio exceeds a threshold (ACT 316). The method 300 can include causing the luminance of the first image to match the luminance of the second image (ACT 318). The method 300 can include detecting an object from the second image or the first image (ACT 320).

At ACT 302, the method 300 can include receiving a first image. The data processing system 108 can receive the first image from the sensor 106 (e.g., a first sensor). The sensor 106 can be coupled with a body of the vehicle 102. The sensor 106 can have the first field of view 114. The sensor 106 can have the polarizer 110. The polarizer 110 can be coupled with a lens of the sensor 106. The data processing system 108 can receive the first image via a communications interface connecting the data processing system 108 to the sensor 106. The data processing system 108 can receive the first image as the vehicle 102 is driving down the road or while the vehicle 102 is parked.

At ACT 304, the method 300 can include receiving a second image. The data processing system 108 can receive the second image from the sensor 104 (e.g., a second sensor). The sensor 104 can be coupled with the body of the vehicle 102. The sensor 104 can have the second field of view 112. The sensor 104 may not have a polarizer. The data processing system 108 can receive the second image via a communications interface connecting the data processing system 108 to the sensor 104. The data processing system 108 can receive the second image as the vehicle 102 is driving down the road or while the vehicle 102 is parked.

At ACT 306, the method 300 can include determining whether the first image or the second image are associated with a time period (e.g., a defined time period). The time period can correspond to times in which the sun is low over the horizon and therefore causes strong reflections off of horizontal surfaces. Cameras on vehicles can saturate based on the reflections. The polarizer 110 can be a vertical linear polarizer that filters out horizontal light waves. Accordingly, the polarizer 110 can filter out the light waves that reflect off the surfaces during such time periods. Thus, the polarizer 110 can cause the first image captured by the sensor 106 to not be saturated.

The data processing system 108 can determine if the first image or the second image is associated with the time period based on timestamps of the first and second images. For example, the data processing system 108 can generate timestamps for the first and second images upon receiving the first and second images from the sensors 104 and 106. The timestamps can indicate times of receipt of the first and second images. The data processing system 108 can compare the timestamps of the first and second images to the time period and determine if one or both of the first or second images is associated with the time period based on the comparison.

Responsive to determining one or both of the first or second images is within the time period, at ACT 308, the method 300 can include detecting an object from the first image. The data processing system 108 can use object recognition techniques on the first image to analyze or detect objects from the first image. The data processing system 108 can use object recognition techniques on the first image and not the second image because the images correspond to a time period in which the sun is likely to saturate any images the sensor 104 captures by reflecting light off of horizontal surfaces. Because the sensor 106 has the polarizer 110 to filter out such reflections, the first image captured by the sensor 106 may not include the same saturation. Accordingly, the data processing system 108 can avoid inaccurately detecting objects in saturated images during time periods in which such saturation is likely by only analyzing images that were generated by the sensor 106 with the polarizer during such time periods.

The data processing system 108 can select the first image for object detection based on the scene contrasts in the first image and the second image. For example, the data processing system 108 can determine the scene contrast in each of the first image and the second image. The data processing system 108 can do so by identifying the luminance of different portions of each image and comparing the luminance with the luminance of other portions of the same image. Bigger differences between the low luminance portions and the high luminance portions of the same image can indicate a high scene contrast while smaller differences can indicate a low scene contrast. The data processing system 108 can compare the scene contrasts with each other or with a threshold. In one example, responsive to determining the scene contrast of the second image (e.g., the image capture by the sensor 104 without the polarizer 110) is less than a threshold or is less than the scene contrast of the scene contrast of the first image by an amount exceeding a threshold, the data processing system 108 can use object detection techniques on the first image and not the second image. In another example, responsive to determining the scene contrast of the second image exceeds a threshold or is greater than the scene contrast of the scene contrast of the first image by an amount exceeding a threshold, the data processing system 108 can use object detection techniques on the first image and not the second image.

Using scene contrast to select images to use for object detection can improve object detection in images of specific scenes. For example, the first and second images can be images of a water puddle at night that is illuminated by street lamps. This scene can create a significant amount of flare in the first image and the second image. Because the polarizer 110 can reduce flare in images captured by the sensor 108, the data processing system 108 can use object detection techniques on the first image and not the second image based on the lower scene contrast in the first image.

At ACT 310, the method 300 can include determining whether the first image or the second image includes an object (e.g., a defined object or a saturation object, such as a traffic light). The object can be an object that causes the luminance of images from which the data processing system 108 used object recognition techniques to detect the object to be high and cause the data processing system 108 to inaccurately detect objects from the images. The data processing system 108 can determine whether the first or the second image includes such an object by using object recognition techniques on the first and second images. The data processing system 108 can compare identifications of the detected objects to object identifications in a database (e.g., the data repository 128) in memory of the data processing system 108. The data processing system 108 can identify matching identifications in the database. The data processing system 108 can determine whether the matching identifications have a stored association with a flag or indication that causes the data processing system 108 to only use images from the sensor 106 (e.g., the sensor with the polarizer 110) of matching pairs of images captured by the sensors 104 and 106 if a detected object that corresponds to the flag or indication is depicted in at least one of the two images.

Responsive to identifying a match between the detected objects in one or both of the first and second images and a flagged object in the database, at ACT 312, the data processing system 108 can detect an object from the first image. The data processing system 108 can detect the object from the first image to use to generate instructions based on the detected object. For example, responsive to the data processing system 108 detecting a traffic light in one or both of the first or second image, the data processing system 108 can determine to analyze the first image for objects or otherwise discard (e.g., remove from memory) any detected objects from the second image. The data processing system 108 can subsequently only use the objects from the first image to generate vehicle commands or alerts. The data processing system 108 can do so to avoid detecting objects from images that can cause the same images to be saturated or for any detected objects to be inaccurate.

For example, because traffic lights are commonly configured to emit bright lights, the lights given off by the traffic lights can cause the sensor 104 without a polarizer to generate saturated images of the traffic light. Such saturated images can cause the data processing system to detect red lights as yellow lights or green lights using object recognition techniques on the saturated images. Accordingly, responsive to detecting a traffic light in the first or second image, the data processing system 108 can discard any objects the data processing system detected in the second image and only use object recognition techniques to analyze the first image to generate vehicle instructions, commands, or alerts.

At ACT 314, the method 300 can include determining a luminance of light ratio. The data processing system 108 can determine values of the luminance of the first image and the second image. To do so, for example, the data processing system 108 can extract values for the red, green, and blue from the first image and the second. The image analyzer 120 can execute a relative luminance function using extracted values for the reds, greens, and blues (e.g., $luminance = 0.2126 \cdot R_{lin} + 0.7152 \cdot G_{lin} + 0.0722 \cdot B_{lin}$). The data processing system 108 can compare the luminance of the two images to determine a ratio of the luminance of the first image captured by the sensor 106 and the luminance of the second image captured by the sensor 104.

At ACT 316, the method 300 can include determining whether the ratio exceeds a threshold (e.g., a ratio threshold). The data processing system 108 can determine whether the ratio exceeds the threshold by comparing the ratio to the threshold.

Responsive to determining the ratio exceeds the threshold, at ACT 318, the method 300 can include causing the luminance of the first image and the second image to match or substantially match. The data processing system 108 can cause the luminance of the first image and the second image to match or substantially match by determining a gain to apply to the signal of the first image. The data processing system 108 can determine the gain is the ratio in cases in which the luminance of the second image is on top of the luminance of the first image in the ratio or the gain is the inverse of the ratio in cases in which the luminance of the first image is on top of the luminance of the second image in the ratio. The data processing system 108 can increase the digital or analogue gain of the signal of the first image according to the determined gain. Accordingly, the data processing system 108 can cause the luminance of the first image to match or substantially match the luminance of the second image despite the sensor 106 that captured the first image having the polarizer 110.

By using a ratio of the luminance between the two images, the data processing system 108 can adjust the gain of images regardless of the scale of the luminance of two matching images. For example, a small difference in luminance between may not matter in terms of calculating the depth of objects from two images at high luminance values, but the same small difference may substantially affect the depth calculation at low luminance values. By using the ratio to determine the gain, the data processing system 108 can determine whether to change the gain of one of the images without regard to the scale of the luminance of the images.

At ACT 320, the method 300 can include detecting objects from the first or second image. The data processing system 108 can detect objects from the first or second image because the data processing system 108 adjusted the luminance of the first image to increase the accuracy of using object recognition techniques on the first image or because the luminance of the first image was not below a threshold that indicates when the luminance is below an unacceptable level to cause object recognition techniques to be inaccurate. The data processing system 108 can detect objects from one or both of the first or second images and use the detected objects to generate instructions, commands, or alerts based on the detected objects in the first or second images.

The data processing system 108 can detect objects from both the first and second images. By doing so, the data processing system 108 can determine depth or distance information regarding the objects in the first and second images. For example, the sensors 104 and 106 can each capture an image of a pothole in the middle of the road. The data processing system 108 can detect the pothole in both images and determine a distance of the vehicle 102 from the pothole using stereo camera depth processing techniques. The data processing system 108 can then generate an alert or an instruction for operation of the vehicle 102 based on the detected pothole.

The data processing system 108 can use sensor fusion techniques to detect objects from a combination of the first and second images. The data processing system 108 can use the sensor fusion techniques in response to determining a scene contrast in the second image exceeds a threshold or a scene contrast of the first image by an amount above a threshold. The data processing system 108 can implement sensor fusion techniques by using averaging, the Brovey method, or principal component analysis on first and second images to generate a single image, a model, or data regarding the first and second images. For example, the data processing system 108 can receive the first image and the second image that are each of the same traffic light (or another scene with a high brightness or luminance). Because the first image was captured by the sensor 106 with the polarizer 110, the data processing system 108 can extract more semantic information in the high brightness areas of the first image than corresponding portions of the second image. Because the second image was captured by the sensor 104 without any polarizer, the data processing system 108 can extract more semantic information in the low brightness area of the second image than corresponding portions of the first image. When the sensors 104 and 106 are synchronized on gain and exposure time, the sensor 106 can have a light saturation level N times higher than the sensor 104, thus increasing the sensor dynamic range by N. Accordingly, when using sensor fusion techniques on the first and second images, the data processing system 108 can have a higher sensing dynamic range than sensor systems without any polarizers.

Figure 4:
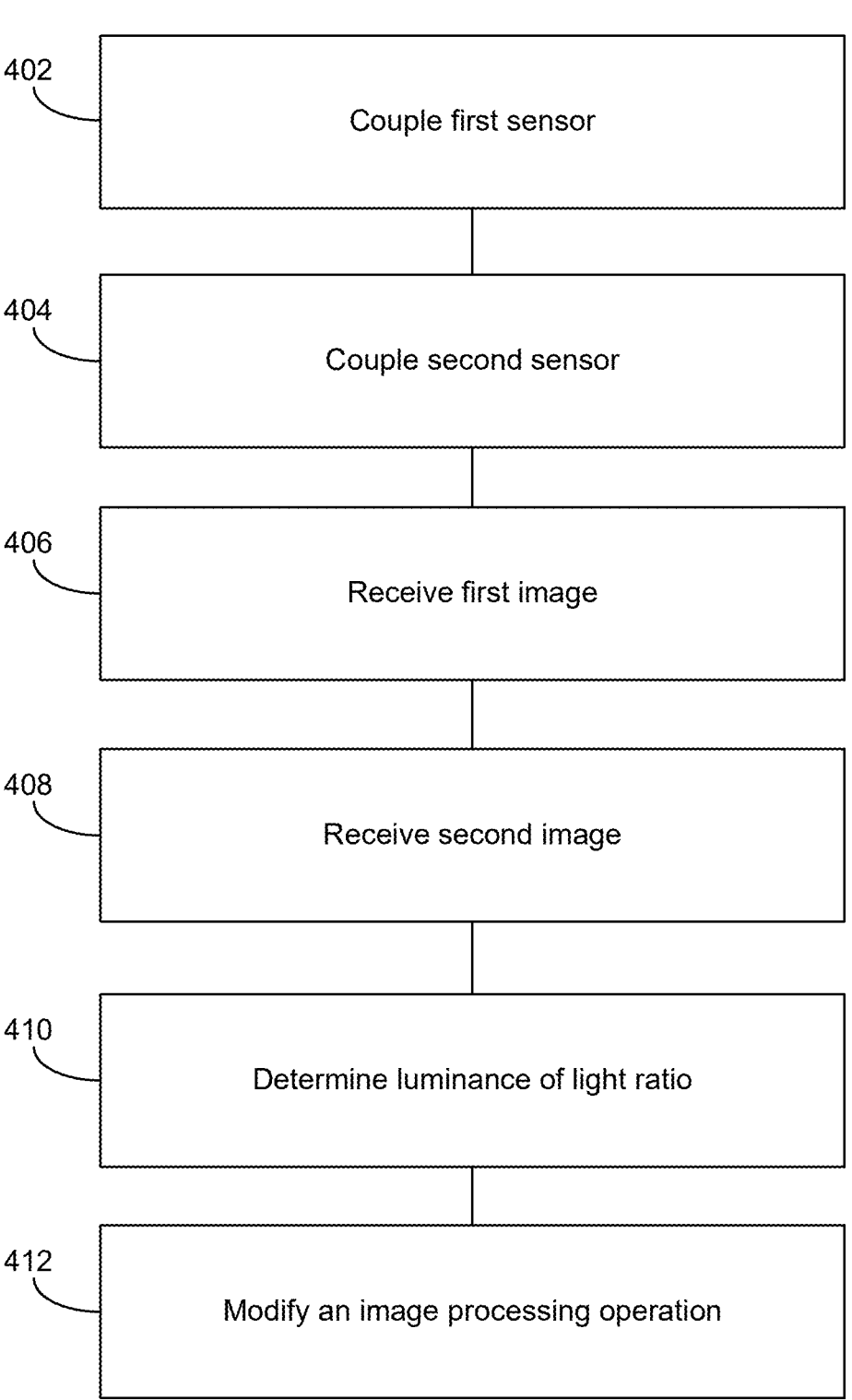
FIG. 4 depicts a method of enhancing object detection capability, in accordance with present implementations.

FIG. 4 depicts a method 400 of enhancing object detection capability, in accordance with present implementations. The method 400 can be performed by components depicted in the system 100 of FIG. 1. The method 400 can include coupling a first sensor to a body of a vehicle (ACT 402). The method 400 can include coupling a second sensor to the body of the vehicle (ACT 404). The method 400 can include receiving a first image (ACT 406). The method 400 can include receiving a second image (ACT 408). The method 400 can include determining a luminance of light ratio (ACT 410). The method 400 can include causing a luminance of light to match (ACT 412).

At ACT 402, the method 400 can include coupling the sensor 106 (e.g., a first sensor) to a body of the vehicle 102. The sensor 106 can be a camera (e.g., a stereo camera). The sensor 106 can have the field of view 114 (e.g., a first field of view). The sensor 106 can include the polarizer 110 coupled with a lens of the sensor 106. The sensor 106 can be disposed on at least one of a bumper of the vehicle 102, an inside of a windshield of the vehicle 102, a hood of the vehicle 102, a window of the vehicle 102, a side panel of the vehicle 102, or a trunk of the vehicle 102.

At ACT 404, the method 400 can include coupling the sensor 104 (e.g., a second sensor) to the body of the vehicle 102. The sensor 104 can be a camera (e.g., a stereo camera). The sensor 104 can have the field of view 112 (e.g., a second field of view). The field of view 112 can have the partially overlapping field of view 116 with the field of view 114. The sensor 104 may not include a polarizer. The sensor 104 can be disposed on at least one of a bumper of the vehicle 102, an inside of a windshield of the vehicle 102, a hood of the vehicle 102, a window of the vehicle 102, a side panel of the vehicle 102, or a trunk of the vehicle 102. The sensor 104 can be disposed at a known base line distance from the sensor 106 to facilitate depth and distance calculations between the vehicle 102 and any objects within the partially overlapping field of view 116.

At ACT 406, the method 400 can include receiving a first image. The data processing system 108 including one or more processors can receive the first image. The sensor 106 with the polarizer 110 can capture the first image. The data processing system 108 can receive the first image from the sensor 106. The data processing system 108 can receive the first image across a communications interface.

At ACT 408, the method 400 can include receiving a second image. The data processing system 108 can receive the second image. The sensor 104 without a polarizer can capture the second image. The data processing system 108 can receive the second image from the sensor 104. The data processing system 108 can receive the second image across a communications interface.

At ACT 410, the method 400 can include determining a luminance of light ratio. The data processing system 108 can determine the luminance of light ratio associated with the first image and the second image. The data processing system 108 can do so by determining the luminance of the first image and the luminance of the second image. The data processing system 108 can determine the luminance according to red, green, and blue values of the pixels in the first and second images and using a relative luminance function. The data processing system 108 can compare the luminance of the first image with the luminance of the second image to determine the luminance of light ratio.

The data processing system 108 can determine a scene contrast for the first image and the second image. For example, the data processing system 108 can identify the luminance of the different portions of each of the first image and the second image. The data processing system 108 can identify the lowest luminance portion and the highest luminance portion of the first image and, separately, of the second image. The data processing system 108 can compare the lowest luminance portions with the highest luminance portions of the respective first and second images to determine a scene contrast for each of the first image and the second image.

At ACT 412, the method 400 can include modifying an image processing operation. The image processing operation can be associated with the first image or the second image. The image processing operation can be instructions or an operation performed by the data processing system 108 to process or analyze images (e.g., use object recognition techniques on images captured by cameras of the vehicle 102). Modifying the image processing operation can include causing a luminance of light to match (e.g., substantially match). The data processing system 108 can cause the luminance of light of the first image captured by the sensor 106 to match the luminance of light of the second image captured by the sensor 104. The data processing system 108 can do so responsive to determining the luminance of light ratio between the first image and the second image exceeds a threshold value. For example, the data processing system 108 can compare the luminance of light ratio to the threshold value and determine the luminance of light ratio exceeds the threshold value. Responsive to determining the luminance of light ratio exceeds the threshold value, the data processing system 108 can cause the luminance of light of the first image to substantially match the luminance of light of the second image.

The data processing system 108 can cause the luminance of light of the first image to substantially match the luminance of light of the second image by increasing a gain of the signal of the first image. The data processing system 108 can increase the gain by increasing an analogue or a digital gain on the signal of the first image. The data processing system 108 can increase the analogue or digital gain by a defined value (e.g., a value equal to a factor of N in which the polarizer 110 reduces the incoming light to the sensor 106) stored in memory or by a value the data processing system determined will cause the luminance of light of the first image to substantially match the luminance of light of the second image. For example, the data processing system 108 can increase the analogue or digital gain by the ratio of the luminance of light of the second image to the luminance of light of the first image to cause the luminance of light of the first image to substantially match the luminance of light of the second image.

Modifying the image processing operation can include selecting an image to use for object detection. For example, responsive to determining a luminance of light of the first image captured by the sensor 106 is too low, the data processing system 108 can select only the second image captured by the sensor 104 for image processing. Responsive to determining a luminance of light of the second image is too high, the data processing system 108 can select only the first image for image processing. In another example, the data processing system 108 can determine a scene contrast of the first image and the second image (e.g., determine differences between high luminance and low luminance portions of the first image and the second image). Responsive to determining the scene contrast of the second image is lower than or lower by an amount of above a threshold from the scene contrast of the first image, the data processing system 108 can select only the first image for image processing.

Modifying the image processing operation can include using sensor fusion techniques on the first and second images. For example, the data processing system 108 can implement sensor fusion techniques by using averaging, the Brovey method, or principal component analysis on the first and second images to generate a single image, a model, or data regarding the first and second images. The data processing system 108 can then use object detection techniques on the single image, model, or data regarding the first and second images.

Figure 5:
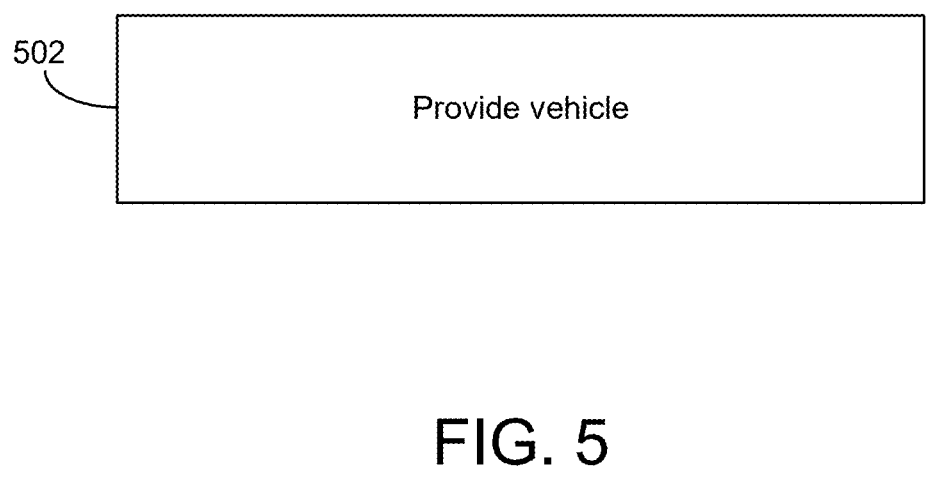

FIG. 5 depicts a method 500 of enhancing object detection capability, in accordance with present implementations. Performance of the method 500 can enable the data processing system to detect objects in images within an enhanced dynamic range. The method 500 can include providing a vehicle (502).

At ACT 502, the method 500 can include providing the vehicle 102. The vehicle 102 can include the sensor 106 (e.g., a first sensor) coupled with a body of the vehicle 102, the sensor 106 having the field of view 114 (e.g., a first field of view) and the sensor 106 comprising the polarizer 110. The vehicle 102 can include the sensor 104 (e.g., a second sensor) coupled with the body of the vehicle 102. The sensor 104 can have the field of view 112 (e.g., the second field of view). The field of view 114 and the field of view 112 can have the at least partially overlapping field of view 116. The vehicle 102 can have a data processing system 108 including a processor coupled with memory. The processor can receive a first image captured by the sensor 106 and a second image captured by the sensor 104. The processor can determine a luminance of light ratio associated with the first image and the second image. The processor can, responsive to determining the luminance of light ratio exceeds a threshold value, cause a luminance of light of the first image to substantially match a luminance of light of the second image. In this way, a vehicle can be provided with an enhanced dynamic range to detect objects for self-driving or a real-time alert system.

Figure 6:
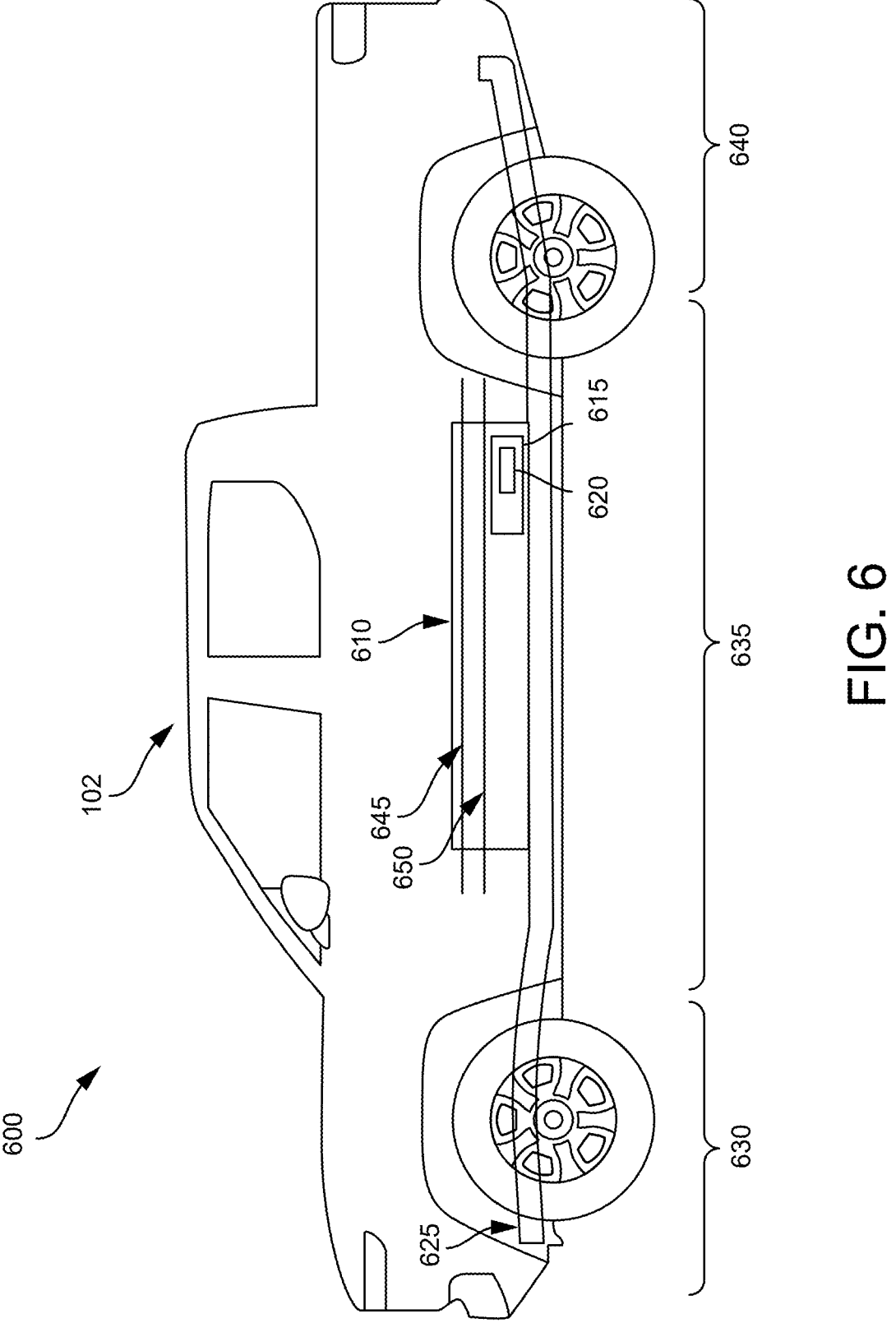
FIG. 6 depicts an electric vehicle, in accordance with the present embodiments.

FIG. 6 depicts an example cross-sectional view 600 of a vehicle 102 installed with at least one battery pack 610, in accordance with present implementations. Vehicles 102 can include electric vehicles, electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 610 can also be used as an energy storage system to power a building, such as a residential home or commercial building. Vehicles 102 can be internal combustion engine vehicles, or fully or partially electric (e.g., plug-in hybrid) vehicle. Further, vehicles 102 can be fully autonomous, partially autonomous, or unmanned. Vehicles 102 can also be human operated or non-autonomous. Vehicles 102 such as electric trucks or automobiles can include on-board battery packs 610, batteries 115 or battery modules 615, or battery cells 620 to power the electric vehicles. The vehicle 102 can include a chassis 625 (e.g., a frame, internal frame, or support structure). The chassis 625 can support various components of the vehicle 102. The chassis 625 can span a front portion 630 (e.g., a hood or bonnet portion), a body portion 635, and a rear portion 640 (e.g., a trunk, payload, or boot portion) of the vehicle 102. The battery pack 610 can be installed or placed within the vehicle 102. For example, the battery pack 610 can be installed on the chassis 625 of the vehicle 102 within one or more of the front portion 630, the body portion 635, or the rear portion 640. The battery pack 610 can include or connect with at least one busbar, e.g., a current collector element. For example, the first busbar 645 and the second busbar 650 can include electrically conductive material to connect or otherwise electrically couple the battery 165, the battery modules 615 or the battery cells 620 with other electrical components of the vehicle 102 to provide electrical power to various systems or components of the vehicle 102.

Figure 7:
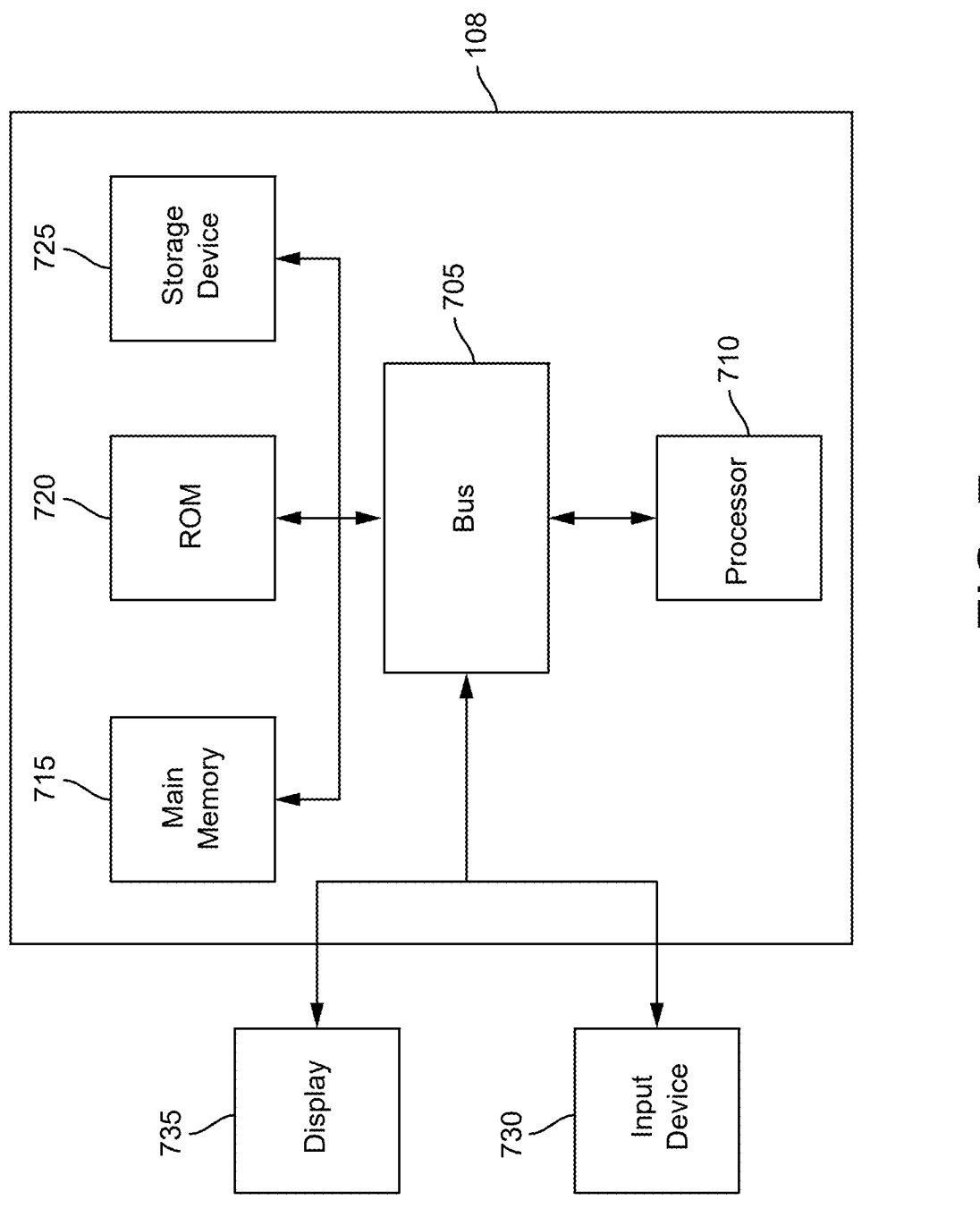
FIG. 7 is a block diagram illustrating an architecture for a computer system that can be employed to implement elements of the systems and methods described and illustrated herein.

FIG. 7 depicts an example block diagram of the data processing system 108, in accordance with some implementations. The data processing system 108 can include or be used to implement a data processing system or its components. The data processing system 108 can include at least one bus 705 or other communication component for communicating information and at least one processor 710 or processing circuit coupled to the bus 705 for processing information. The data processing system 108 can also include one or more processors 710 or processing circuits coupled to the bus for processing information. The data processing system 108 can also include at least one main memory 715, such as a random access memory (RAM) or other dynamic storage device, coupled to the bus 705 for storing information, and instructions to be executed by the processor 710. The main memory 715 can be used for storing information during execution of instructions by the processor 710. The data processing system 108 can further include at least one read only memory (ROM) 720 or other static storage device coupled to the bus 705 for storing static information and instructions for the processor 710. A storage device 725, such as a solid state device, magnetic disk or optical disk, can be coupled to the bus 705 to persistently store information and instructions.

The data processing system 108 can be coupled via the bus 705 to a display 735, such as a liquid crystal display, or active matrix display, for displaying information to a user such as a driver of the vehicle 102 or other end user. An input device 730, such as a keyboard or voice interface can be coupled to the bus 705 for communicating information and commands to the processor 710. The input device 730 can include a touch screen display 735. The input device 730 can also include a cursor control, such as a mouse, a trackball, or cursor direction keys, for communicating direction information and command selections to the processor 710 and for controlling cursor movement on the display 735.

The processes, systems and methods described herein can be implemented by the data processing system 108 in response to the processor 710 executing an arrangement of instructions contained in main memory 715. Such instructions can be read into main memory 715 from another computer-readable medium, such as the storage device 725. Execution of the arrangement of instructions contained in main memory 715 causes the data processing system 108 to perform the illustrative processes described herein. One or more processors in a multi-processing arrangement can also be employed to execute the instructions contained in main memory 715. Hard-wired circuitry can be used in place of or in combination with software instructions together with the systems and methods described herein. Systems and methods described herein are not limited to any specific combination of hardware circuitry and software.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a sole-noid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A vehicle, comprising:
a first sensor coupled with the vehicle, the first sensor including a first polarizer;
a second sensor coupled with the vehicle, wherein the second sensor does not comprise a second polarizer;
the first sensor and the second sensor having an at least partially overlapping field of view; and
one or more processors coupled with memory to:
    receive a first image from light detected by the first sensor and a second image from light detected by the second sensor;
    determine a luminance of light ratio between a first luminance of a first plurality of pixels of the first image and a second luminance of a second plurality of pixels of the second image;
    label the first image with a timestamp that indicates a time of creation of the first image;
    determine that the timestamp indicates that the one or more processors obtained the first image within a defined timeframe;
    based on the luminance of light ratio, modify an image processing operation associated with the first image or the second image; and
    analyze the first image using object recognition techniques and not the second image, based on the timestamp.

2. The vehicle of claim 1, wherein the timestamp is a first timestamp, comprising the one or more processors to:
receive a third image generated from light detected by the first sensor and a fourth image generated from light detected by the second sensor;
determine a second timestamp indicates that the one or more processors received the fourth image within a defined time frame; and
analyze the third image using object recognition techniques and not the fourth image responsive to the determination that the second timestamp indicates that the one or more processors received the fourth image within the defined time frame.

3. The vehicle of claim 1, wherein the timestamp is a first timestamp, comprising the one or more processors to:
label the second image with a second timestamp that indicates a time of creation of the second image; and
determine to not analyze the second image based on the second timestamp.

4. The vehicle of claim 1, wherein the timestamp is a first timestamp, comprising the one or more processors to:
label the second image with a second timestamp that indicates a time of creation of the second image;
receive a third image generated from light detected by the first sensor and a fourth image generated from light detected by the second sensor;
label the third image with a third timestamp; and
label the fourth image with a fourth timestamp.

5. The vehicle of claim 1, wherein the timestamp indicates the time of creation of the first image and identifies the first sensor.

6. The vehicle of claim 1, wherein the timestamp is a first timestamp, comprising the one or more processors to:
label the second image with a second timestamp; and determine the first timestamp and the second timestamp indicate times within a threshold range of each other.

7. The vehicle of claim 1, wherein the timestamp is a first timestamp, comprising the one or more processors to:
label the second image with a second timestamp; and
determine based at least in part on the first timestamp and the second timestamp, that the first image and the second image are matching images.

8. The vehicle of claim 1, wherein the timestamp is a first timestamp, comprising the one or more processors to:
label the second image with a second timestamp; and
compare the first timestamp and the second timestamp with a time frame to determine that the first timestamp and the second timestamp are both within the time frame.

9. The vehicle of claim 1, comprising the one or more processors to:
detect an object from the first image; and
generate instructions based on the detected object.

10. The vehicle of claim 1, comprising the one or more processors to:
detect a lane marker on a road or a red light of a traffic light from the first image; and
generate instructions based on the detected lane marker or the red light.

11. The vehicle of claim 1, comprising the one or more processors to:
increase an analogue or digital gain of the light detected by the first sensor, the increase causing the first luminance of the first plurality of pixels to substantially match the second luminance of the second plurality of pixels.

12. The vehicle of claim 1, comprising the one or more processors to:
increase an analogue or digital gain of the light detected by the first sensor by a defined value.

13. The vehicle of claim 1, comprising:
the first sensor and the second sensor disposed on at least one of a bumper of the vehicle, an inside of a windshield of the vehicle, a hood of the vehicle, a window of the vehicle, a side panel of the vehicle, or a trunk of the vehicle.

14. The vehicle of claim 1, wherein the first sensor comprises a first camera and the second sensor comprises a second camera.

15. The vehicle of claim 1, wherein the first polarizer comprises a vertical linear polarizer to filter out horizontal light waves.

16. The vehicle of claim 1, wherein the first polarizer of the first sensor is disposed in front of a lens of the first sensor.

17. The vehicle of claim 1, wherein the light detected by the first sensor includes a lower luminance than a luminance of the light detected by the second sensor.

18. A method, comprising:
coupling a first sensor with a vehicle, the first sensor including a first polarizer;
coupling a second sensor with the vehicle, wherein the second sensor does not comprise a second polarizer, the first sensor and the second sensor having an at least partially overlapping field of view;
receiving, by one or more processors, a first image from light detected by the first sensor and a second image from light detected by the second sensor;
determining, by the one or more processors, a luminance of light ratio between a first luminance of the first image and a second luminance of the second image;

labelling, by the one or more processors, the first image with a timestamp that indicates a time of creation of the first image;

determining, by the one or more processors, that the timestamp indicates that the one or more processors obtained the first image within a defined timeframe;

modifying, by the one or more processors, based on the luminance of light ratio, an image processing operation associated with the first image or the second image; and analyzing, by the one or more processors, the first image using object recognition techniques and not the second image, based on the timestamp.

19. The method of claim 18, wherein the timestamp is a first timestamp, comprising:

receiving, by the one or more processors, a third image generated from light detected by the first sensor and a fourth image generated from light detected by the second sensor;

determining, by the one or more processors, a second timestamp indicates that the one or more processors received the fourth image within a defined time frame; and analyzing, by the one or more processors, the third image using object recognition techniques and not the fourth image responsive to determining that the second timestamp indicates that the one or more processors received the fourth image within the defined time frame.

20. The method of claim 18, wherein the timestamp is a first timestamp, comprising:

labelling, by the one or more processors, the second image with a second timestamp that indicates a time of creation of the second image; and determining, by the one or more processors, to not analyze the second image based on the second timestamp.

* * * * *